(12) United States Patent
Yaung

(10) Patent No.: US 7,272,833 B2
(45) Date of Patent: Sep. 18, 2007

(54) MESSAGING SERVICE IN A FEDERATED CONTENT MANAGEMENT SYSTEM

(75) Inventor: Alan T. Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1277 days.

(21) Appl. No.: 09/750,489

(22) Filed: Dec. 26, 2000

(65) Prior Publication Data

US 2002/0124116 A1 Sep. 5, 2002

(51) Int. Cl.
*G06F 9/44* (2006.01)
(52) U.S. Cl. ............... 719/314; 709/201; 709/203; 707/3; 707/10
(58) Field of Classification Search ........... 709/310, 709/313, 314, 232, 226, 315, 238, 101, 201, 709/203, 217; 707/1, 3, 10; 370/412; 719/310–315, 719/318; 713/175
See application file for complete search history.

(56) References Cited

U.S. PATENT DOCUMENTS

| | | | | |
|---|---|---|---|---|
| 5,230,051 A | | 7/1993 | Quan ..................... 395/700 |
| 5,537,593 A | | 7/1996 | Diamond et al. ........ 395/650 |
| 5,548,760 A | | 8/1996 | Healey .................... 395/650 |
| 5,590,334 A | | 12/1996 | Saulpaugh et al. ...... 395/683 |
| 5,699,523 A | * | 12/1997 | Li et al. ................ 709/238 |
| 5,835,764 A | | 11/1998 | Platt et al. ............. 395/671 |
| 5,926,636 A | | 7/1999 | Lam et al. ............... 395/683 |
| 5,933,656 A | | 8/1999 | Hansen .................... 395/882 |
| 5,950,014 A | | 9/1999 | Hickerson et al. ....... 395/834 |
| 5,991,820 A | | 11/1999 | Dean ....................... 709/300 |
| 6,009,472 A | * | 12/1999 | Boudou et al. .......... 709/232 |
| 6,058,389 A | * | 5/2000 | Chandra et al. ............ 707/1 |
| 6,226,689 B1 | * | 5/2001 | Shah et al. ............. 709/314 |
| 6,401,136 B1 | * | 6/2002 | Britton et al. .......... 709/314 |
| 6,425,017 B1 | * | 7/2002 | Dievendorff et al. .... 709/315 |
| 6,446,206 B1 | * | 9/2002 | Feldbaum ................ 713/175 |
| 6,449,646 B1 | * | 9/2002 | Sikora et al. ........... 709/226 |
| 6,490,585 B1 | * | 12/2002 | Hanson et al. ........... 707/10 |
| 6,529,932 B1 | * | 3/2003 | Dadiomov et al. ...... 709/101 |
| 6,546,428 B2 | * | 4/2003 | Baber et al. ............ 709/232 |
| 6,563,836 B1 | * | 5/2003 | Capps et al. ............ 370/412 |
| 6,697,835 B1 | * | 2/2004 | Hanson et al. .......... 709/201 |
| 6,742,050 B1 | * | 5/2004 | Beck et al. ............. 719/315 |
| 6,760,719 B1 | * | 7/2004 | Hanson et al. ............ 707/3 |
| 6,848,108 B1 | * | 1/2005 | Caron .................... 719/315 |
| 7,007,275 B1 | * | 2/2006 | Hanson et al. .......... 718/101 |

OTHER PUBLICATIONS

"Microsoft Message Queuing Services", Microsoft Corporation 1997, pp. 1-21.*

(Continued)

*Primary Examiner*—Van Nguyen
(74) *Attorney, Agent, or Firm*—Sughrue Mion, PLLC

(57) ABSTRACT

A technique for communication between a first computer and a second computer, each of which is connected to a server computer. Under control of a first application at the first computer, a message is created, wherein the message comprises zero or more text and zero or more content identifiers, and the message is put into a message queue. Under control of a second application at the second computer, the message is retrieved from the message queue.

30 Claims, 6 Drawing Sheets

OTHER PUBLICATIONS

Zimran et al. "Performance Analysis of Distributed Client-Server Message Queuing", 1994 IEEE, pp. 550-555.*

"Method of Keeping and Synchronizing Time in a Message-Passing Distributed System", IBM Technical Disclosure Bulletin, vol. 32, No. 12, p. 422-425, May 1990.

"Real-Time Message Passing in UNIX-Like Architectures", IBM Technical Disclosure Bulletin, vol. 38, No. 6, p. 463, Jun. 1995.

* cited by examiner

MESSAGING SERVICE IN A FEDERATED CONTENT MANAGEMENT SYSTEM

FIELD OF THE INVENTION

This invention relates in general to database management systems performed by computers, and in particular, to a messaging service in a federated content management system.

BACKGROUND OF THE INVENTION

The present invention relates to a system and method for representing and searching multiple heterogeneous datastores and managing the results of such searches. Datastore is a term used to refer to a generic data storage facility, such as a relational data base, flat-file, hierarchical data base, etc. Heterogeneous is a term used to indicate that the datastores need not be similar to each other. For example, each datastore may store different types of data, such as image or text, or each datastore may be based on a different theory of data model, such as Digital Library/VisualInfo or Domino Extended Search (DES).

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3-4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between application programs, indices, and data to ensure independence from any changes in the location of the data.

The indexing of business data is often imbedded into the data itself. When the automated business process stores a person's name in the column "NAME," it actually indexes that information. Multimedia information objects usually do not contain indexing information. This "meta data" needs to be created in addition by developers or librarians. The indexing information for multimedia information is often kept in "business like" databases separated from the physical object.

In a Digital Library (DL), the multimedia object can be linked with the associated indexing information, since both are available in digital form. Integration of this legacy catalog information with the digitized object is crucial and is one of the great advantages of DL technology. Different types of objects can be categorized differently as appropriate for each object type. Existing standards like MARC records for libraries, Finding Aids for archiving of special collections, etc . . . can be used when appropriate.

The indexing information used for catalog searches in physical libraries is mostly what one can read on the covers of the books: authors name, title, publisher, ISBN, . . . enriched by other information created by librarians based on the content of the books (abstracts, subjects, keywords, . . . ). In digital libraries, the entire content of books, images, music, films, etc . . . are available and "new content" technologies are needed; technologies for full text searching, image content searching (searching based on color, texture, shape, etc . . . ), video content searching, and audio content searching. The integrated combination of catalog searches (e.g. SQL) with content searches will provide more powerful search and access functions. These technologies can also be used to partially automate further indexing, classification, and abstracting of objects based on content.

To harness the massive amounts of information spread throughout these networks, it has become necessary for a user to search numerous storage facilities at the same time without having to consider the particular implementation of each storage facility.

Object-oriented approaches are generally better suited for such complex data management. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

Some known programming tools that can be used for developing search and result-management frameworks include IBM VisualAge C++, Microsoft Visual C++, Microsoft Visual J++, and Java.

Messaging is an important element for developing sensible application programs in enterprise computing. Conventional federated content management systems do not provide a messaging capability for application program development. Without this messaging capability, it is difficult to communicate between two geographically remote application programs in a federated content management system.

Furthermore, messaging is critical to applications in a federated content management system that consists of various heterogeneous back-end servers (e.g., Digital Library, OnDemand, ImagePlus 390, etc.). A typical federated search may return a search result list containing a collection of data from different servers. Without the messaging capability, it is not easy to send the federated search results from one application program to another application program.

Lastly, event notification is essential in coordinating concurrent application programs in a federated content management system. Without the messaging capability, it would be difficult to implement event notification between two geographically remote application programs in a federated content management system.

There is a need in the art for an improved federated content management system. In particular, there is a need in the art for a messaging service in a federated content management system.

SUMMARY OF THE INVENTION

To overcome the limitations in the prior art described above, and to overcome other limitations that will become apparent upon reading and understanding the present specification, the present invention discloses a method, apparatus, and article of manufacture for a messaging service in a federated content management system.

According to an embodiment of the invention, a technique for communication between a first computer and a second computer, each of which is connected to a server computer, is described. Under control of a first application at the first computer, a message is created, wherein the message comprises zero or more text and zero or more content identifiers, and the message is put into a message queue. Under control of a second application at the second computer, the message is retrieved from the message queue.

BRIEF DESCRIPTION OF THE DRAWINGS

Referring now to the drawings in which like reference numbers represent corresponding parts throughout.

DETAILED DESCRIPTION

In the following description of embodiments of the invention, reference is made to the accompanying drawings which form a part hereof, and in which are shown by way of illustration specific embodiments in which the invention may be practiced. It is to be understood that other embodiments may be utilized and structural and functional changes may be made without departing from the scope of the present invention.

Federated Content Management System

A. Federated Architecture

Figure 1:
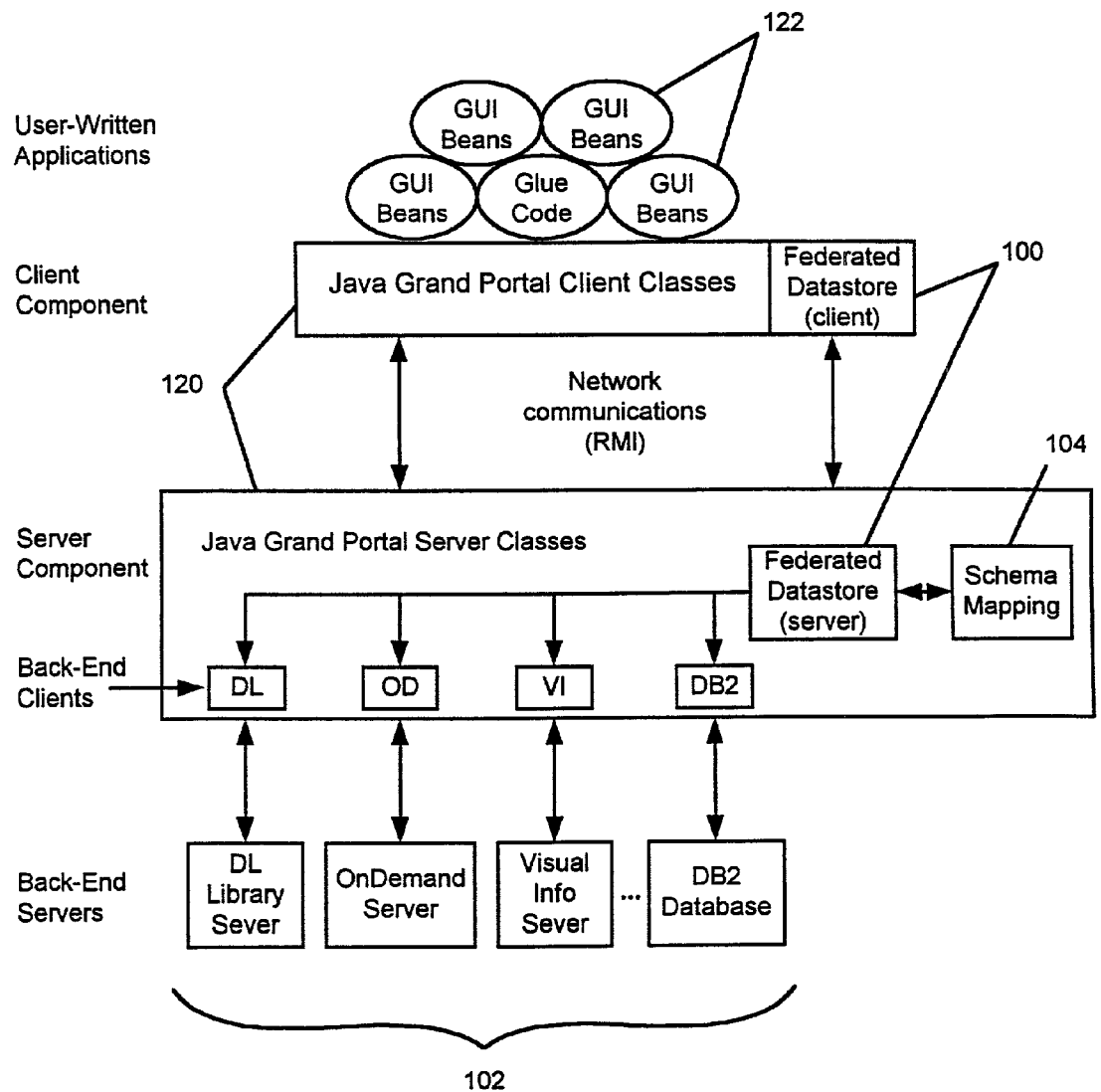
FIG. 1 is a diagram illustrating a computer architecture that could be used in accordance with the present invention.

FIG. 1 is a diagram illustrating a computer architecture that could be used in accordance with the present invention. The present invention is described herein by way of example and is not intended to be limited to the described embodiment. The description of one embodiment is based on, but certainly not limited to, the IBM design of Java Grand Portal Class Library, the Digital Library Java Application Programming Interface (API).

The Java Grand Portal 120 is comprised of client and server classes. In particular, Java Grand Portal is a set of Java classes which provides access and manipulation of local or remote data stored in Digital Library storage facilities. It uses a Java API based on OMG-Object Query Services (OQS) and a Dynamic Data Object protocol, which is apart of OMG/Persistence Object Services.

The Java API provides multi-search capabilities such as:

1. Searching within a given datastore using one or a combination of supported query types, i.e., Parametric query—Queries requiring an exact match on the condition specified in the query predicate and the data values stored in the datastore.

Text query—Queries on the content of text fields for approximate match with the given text search expression, e.g. the existence (or non-existence) of certain phrases or word-stems.

Image query—Queries on the content of image fields for approximate match with the given image search expression, e.g. image with certain degree of similarity based on color percentages, layout, or texture.

2. Each search type is supported by one or more search-engines.

3. Searching on the results of a previous search.

4. Searching involving heterogeneous datastores.

The Digital Library Grand Portal classes provide a convenient API for Java application users; the applications can be located at local or remote sites. Java classes will typically reside on both server and client sides; both sides providing the same interface. The client side of Java classes communicates with the server side to access data in the Digital Library through the network. Communication between client and server sides is done by these classes; it is not necessary to add any additional programs.

In particular, FIG. 1 is an architectural diagram outlining the structure of the federated search for Digital Library repositories using the federated datastore 100, comprised of a federated datastore client and server. A federated datastore 100 is a virtual datastore which combines several heterogeneous datastores 102 into a consistent and unified conceptual view. This view, or a federated schema, is established via schema mapping 104 of the underlying datastores. The users interact with a federated datastore 100 using the federated schema, without needing to know about the individual datastores 102 which participate in the federated datastore 100.

One embodiment of the invention provides a password system that supports password encryption and decryption for user authentication in a federated content management system. In one embodiment of the invention, one or more programs or functions implement the password system. In one embodiment, these programs and functions reside at the federated datastore.

The federated datastore 100 does not have a corresponding back-end client. Since it is a virtual datastore, the federated datastore 100 relies on the underlying physical back-end client associated with it, such as the DL client (i.e., Digital Library client), OnDemand, VisualInfo, etc. As mentioned before, this association is established by a schema mapping component 104.

The communication between the federated datastore 100 client and server can be done by any appropriate protocol. On top of Java Grand Portal client classes, the users can develop application programs using, for example, any existing Java Beans 122 development environment.

The federated datastore 100 coordinates query evaluation, data-access, and transaction processing of the participating heterogeneous datastores 102. Given the federated schema, a multi-search query can be formulated, executed, and coordinated to produce results in the form of a datastore-neutral dynamic data object.

Note that each heterogeneous datastore and the federated datastore are created using one datastore definition. The federated datastore 100 and the heterogeneous datastores 102 are all subclasses of a class called Datastore, therefore, all of these datastores 100 and 102 have the same interface. Therefore, a user would be able to access the federated datastore 100 and the heterogeneous datastores 102 in a consistent and uniform manner.

Additionally, the objects stored in the federated datastore 100 and the heterogeneous datastores 102 are subclasses of an Object class. The Object class includes subclasses for dynamic data objects (DDOs) and extended data objects (XDOs). A DDO has attributes, with type, value, and properties. The value of an attribute can be a reference to another DDO or XDO, or a collection of DDOs or XDOs.

Figure 2:
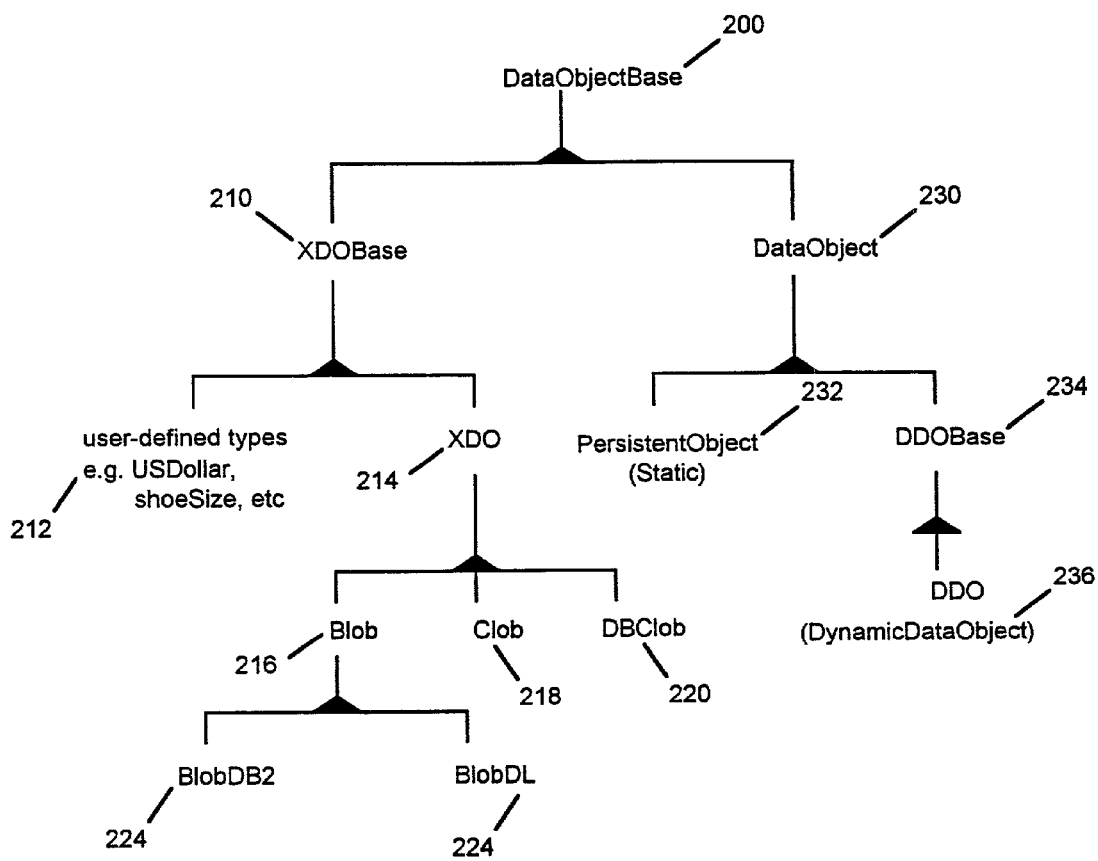
FIG. 2 is a diagram illustrating a class hierarchy for Data Object classes.

FIG. 2 is a diagram illustrating a class hierarchy for Data Object classes. The objects stored in and manipulated by the datastores and fetch operations belong to data object classes. These objects are returned as the result of a fetch, or created and used in CRUD (add, retrieve, update, delete) operations.

A DataObjectBase 200 is an abstract base class for all data objects known by datastores. It has a protocol attribute, that indicates to the datastore which interface can be used to operate on this object. A XDOBase 210 is the base class used to represent user-defined-types (UDT) or large objects. In particular, the XDOBase 210 is the base class for some user-defined types 212 and XDOs 214 .A XDO 214 represents complex UDTs or large objects (LOB). This object can exist stand-alone or as a part of a DDO 236. Therefore, it has a persistent object identifier and CRUD operations capabilities.

Blob 216 is abase class for BLOBs as a place holder to share all generic operations pertaining to BLOBs. Clob 218 is a base class for CLOBs (Character Large Objects) as a placeholder to share all generic operations pertaining to CLOBs. DBClob 220 is a base class for DBCLOBs (database character large object) as a placeholder to share all generic operations pertaining to DBCLOBs. BlobDB2 222 represents a BLOB specific to DB2,and BlobDL 22 represents a BLOB specific to DL. Similarly, though not shown, there may be subclasses for ClobDB2,ClobDL, etc.

A DataObject 230 is a base class for PersistentObject 232 and DDOBase 234. A PersistentObject 232 represents a specific object whose code is statically generated and compiled. This type of object will not be covered in this document. A DDOBase 234 is a base class for a dynamic data object 236 (without the CRUD methods). A DDO (Dynamic Data Object) 236 represents generic data objects which are constructed dynamically at runtime. This object fits well with query and browsing activities in Portal where objects are only known and generated at runtime. It supports the CRUD operations (add, retrieve, update, and delete), and, with the help of its associated datastore, a DDO can put itself into and out of the datastore.

One skilled in the art would recognize that these are only example classes and subclasses and other structures maybe used for objects and other classes or subclasses may be added to or removed from the tree shown in FIG. 2.

With respect to the notion of "federation", each participating datastore preserves the right to maintain its "personality", i.e. its own query language, data-model or schema, method of interaction, etc, and at the same time cooperating in a federation to provide a federated schema. This design allows the users to preserve the natural view to their favorite datastore as well as access them in conjunction with other datastores in a federated context.

The federated datastore 100 can combine the participating native datastores in two ways:

With mapping. As described above, mapping of concepts across participating datastores is established to provide a unified conceptual view. Based on this federated schema, federated queries with both join and union expressions can be formulated.

Without mapping. In this case, the federated datastore 100 only reflects the union of each participating datastore's conceptual view. Although it coordinates query processing and data-access for each underlying datastore, the federated datastore 100 must accept queries in each datastore's native language since the query translation process can not be performed without mapping. In addition, since there is no conceptual mapping between datastores, the FederatedQuery 19 results can only reflect the union of results from each datastore.

The embodiment of the invention is incorporated into one or more software programs that reside at the federated datastore 100. Generally, the software programs and the instructions derived therefrom, are all tangibly embodied in a computer-readable medium, e.g. one or more of the data storage devices, which may be connected to the federated datastore 100. Moreover, the software programs and the instructions derived therefrom, are all comprised of instructions which, when read and executed by the computer system 100, causes the computer system 100 to perform the steps necessary to implement and/or use the present invention. Under control of an operating system, the software programs and the instructions derived therefrom, may be loaded from the data storage devices into a memory of the federated datatstore 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

B. Federated Datastore

Figure 3:
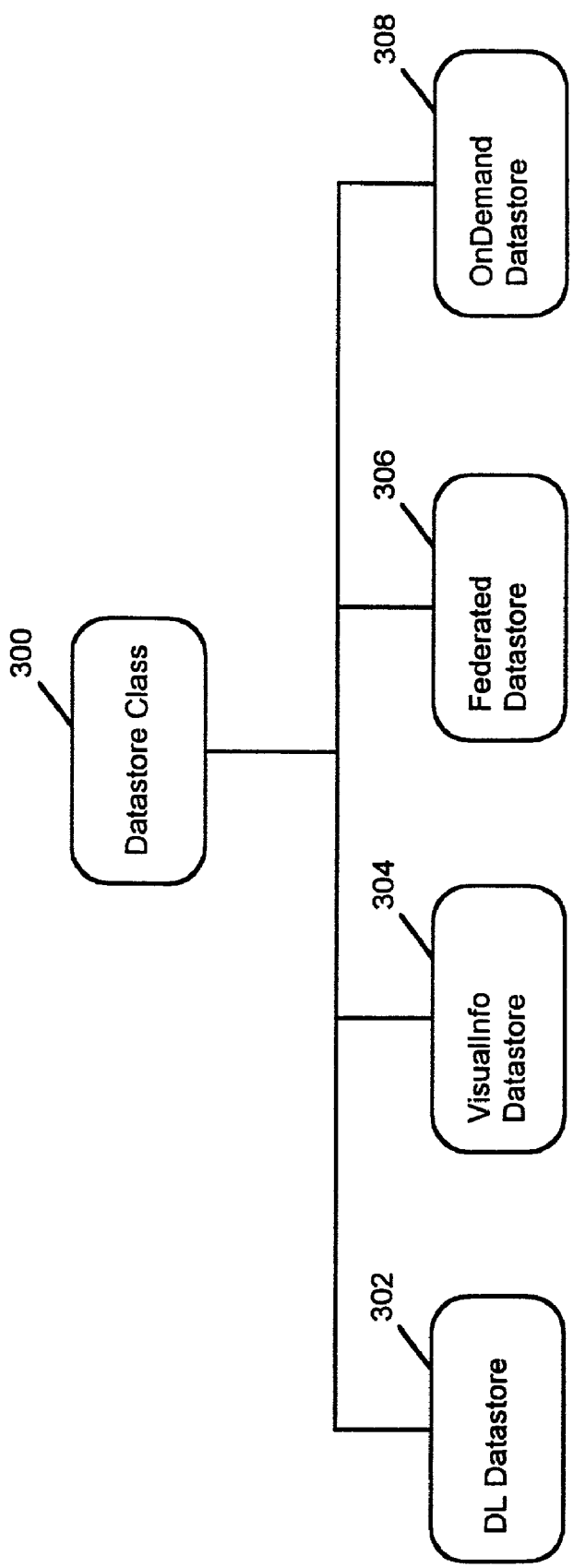
FIG. 3 is a diagram illustrating a class hierarchy for Datastore classes.

FIG. 3 is a diagram illustrating a class hierarchy for Datastore classes. A main datastore class 300 is an abstract base class (i.e., superclass) for all datastores. In particular, some datastore classes that are based on the datastore class 300 and inherit its characteristics are the following: a DL Datastore class 302, a VisualInfo Datastore class 304, a Federated Datastore class 306, and an OnDemand Datastore class 308.

Figure 4:
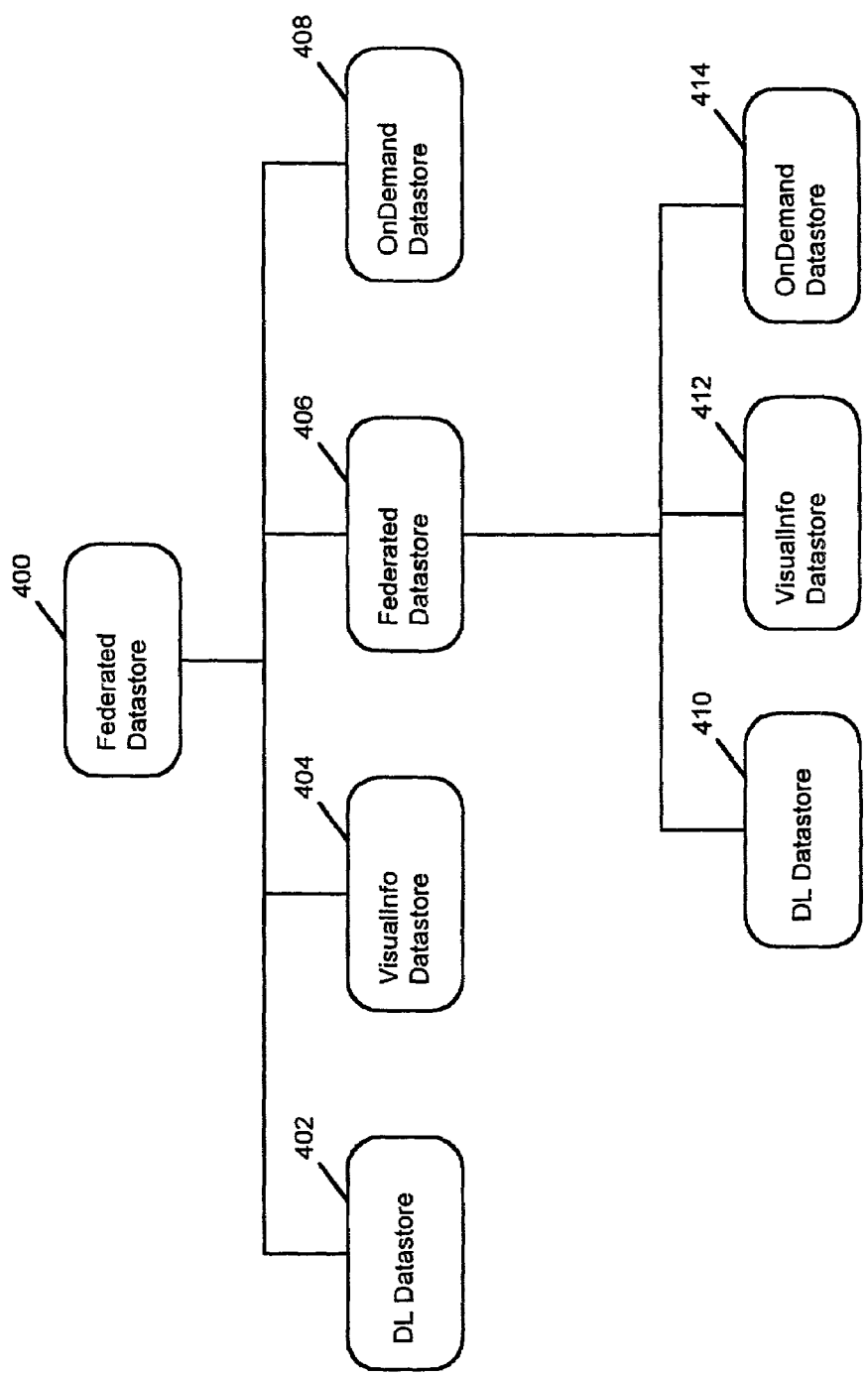
FIG. 4 is a diagram illustrating one composition of a federated datastore.

FIG. 4 is a diagram illustrating one composition of a federated datastore. The federated datastore 400 connects to heterogeneous datastores 402, 404, 406, and 408. As illustrated, a federated datastore 406 may connect to and be nested under federated datastore 400. Additionally, the federated datastore 406 may connect to heterogeneous datastores 410, 412, and 414. The depicted architecture is only a sample, and one skilled in the art would recognize that other examples fall within the scope of the invention.

In the preferred embodiment, the federated datastore 100 takes query strings expressed in a federated query language. An example class definition for DatastoreFederated 100 is set forth below.

DKDatastoreFed.java

```
package com.ibm.mm.sdk.server;
public class DKDatastoreFed extends dkAbstractDataStore
        implements DKConstantFed,
            DKConstant,
            DKMessageIdFed,
            DKMessageId,
            dkFederation,
            java.io.Serializable
{
public dkCollection listEntities( ) throws DKException, Exception
public String[ ] listEntityNames( ) throws DKException, Exception
public String[ ] listTextEntityNames( ) throws DKException, Exception
public String[ ] listParmEntityNames( ) throws DKException, Exception
public dkCollection listEntityAttrs(String entityName) throws DKException, Exception
public String[ ] listEntityAttrNames(String entityName) throws DKException, Exception
public String registerMapping(DKNVPair sourceMap) throws DKException, Exception
public void unRegisterMapping(String mappingName) throws DKException, Exception
public String[ ] listMappingNames( ) throws DKException, Exception
public dkSchemaMapping getMapping(String mappingName) throws DKException,
        Exception
public synchronized dkExtension getExtension(String extensionName) throws
        DKException, Exception
public synchronized void addExtension(String extensionName,
        dkExtension extensionObj) throws DKException, Exception
public synchronized void removeExtension(String extensionName) throws DKException,
        Exception
public synchronized String[ ] listExtensionNames( ) throws DKException, Exception
public DKDDO createDDO(String objectType,
        int Flags) throws DKException, Exception
public dkCollection listSearchTemplates( ) throws DKException, Exception
public String[ ] listSearchTemplateNames( ) throws DKException, Exception
public dkSearchTemplate getSearchTemplate(String templateName) throws DKException,
        Exception
public void destroy( ) throws DKException, Exception
public synchronized string addRemoveCursor (dkResultSetCursor iCurt int action)
        throws DKException, Exception
public dkDatastore datastoreByServerName (String dsType, String dsName)
        throws DKException, Exception
public void changePassword (String serverName,
        String user Id,
        String oldPwd,
        String newPwd)
        throws DKException, Exception
public void requestConnection (String serverName,
        String userId,
        String passwd,
        String connectString)
        throws DKException, Exception
public void excludeServer (Sting serverName, String templateName)
        throws DKException, Exception
public boolean isServerExcluded (String serverName, String templateName)
        throws DKException, Exception, java.rmi.RemoteException
public String[ ] listExcludedServers(String templateName) throws DKException,
        Exception
public void clearExcludedServers(String templateName) throws DKException, Exception
};
```

The following methods are part of the federated datastore class:

```
public DKDatastoreFed( ) throws DKException, Exception
    Constructs default Federated Datastore.
public DKDatastoreFed(String configuration) throws DKException, Exception
    Constructs default Federated Datastore.
public void connect (String datastore_name,
        String user_name,
        String authentication,
        String connect_string) throws DKException, Exception
    Establishes a connection to a federated datastore.
    Parameters:
        datastore_name - federated datastore name
        user_name - userid to logon to this federated datastore
        authentication - password for this user_name
        connect_string - additional information string
    Throws: DKException
        if either:
        datastore_name, user_name, or authentication is null
        or if error occurs in the federated datastore
        Overrides:
            connect in class dkAbstractDatastore
public void disconnect( ) throws DKException, Exception
    Disconnects from the federated datastore.
    Throws: DKException
        if unable to disconnect from server.
    Overrides:
        disconnect in class dkAbstractDatastore
public Object getOption(Int option) throws DKException
    Gets defined datastore option
    Parameters:
        option - an option id
    Returns:
        the value for the given option
    Throws: DKException
        if option is not set
    Overrides:
        getOption in class dkAbstractDatastore
public void setOption(int option, Object value) throws DKException
    Sets the given "option" with a specific "value".
    Parameters:
        option - an option id
        value - the value for the "option"
    Throws: DKException
        if option/value is invalid
    Overrides:
        setOption in class dkAbstractDatastore
public Object evaluate(String command,
        short commandLangType,
        DKNVPair params[ ]) throws DKException, Exception
    Evaluates a query and returns the result as a dkQueryableCollection object.
    Parameters:
        command - a query stirng that represent the query criteria
        commandLangType - a query language type, for Federated, it will be
            DK_FEDERATED_QL_TYPE
        params - a name/value pairs list
    Returns:
        a query result collection
    Throws: DKException
        if "command" argument is null
    Overrides:
        evaluate in class dkAbstractDatastore
public Object evaluate (dkQuery query) throws DKException, Exception
    Evaluates a query and returns the result as a DKAny containing dkQueryableCollection.
    Parameters:
        query - a given query object
    Returns:
        a query result collection
    Throws: DKException
        if the "query" input is null or not of federated query type.
    Overrides:
        evaluate in class dkAbstractDatastore
public Object evaluate (DKCQExpr qe) throws DKException, Exception
    Evaluates a query.
    Parameters:
        qe - a common query expression object
    Returns:
```

```
            a collection of the results
    Throws: DKException
            if common query expression object is invalid
    Overrides:
            evaluate in class dkAbstractDatastore
public dkResultSetCursor execute(String command,
            short commandLangType,
            DKNVPair params[ ]) throws DKException, Exception
    Executes a command query of the federated datastore and returns a result set cursor.
    Parameters:
            command - a query string that represents the query criteria.
            commandLangType - a query language type, for Federated, it will be
                DK_FEDERATED_QL_TYPE.
            params[ ] - a name/value pairs list.
    Returns:
            a dkResultSetCursor object.
    Throws: DKException
            if "command" is null or invalid, or "commandLangType" is not Federated
            Query type.
    Overrides:
            execute in class dkAbstractDatastore
public dkResultSetCursor execute(dkQuery query) throws DKException, Exception
    Executes a command query of the federated datastore and returns a result set cursor. This
method takes a Federated query object as an argument.
    Parameters:
            query - a federated dkQuery object
    Returns:
            a dkResultSetCursor object
    Throws: DKException
            if "query" object is null or query.qlType( ) is not DK_FEDERATED_QL_TYPE
    Overrides:
            execute in class dkAbstractDatastore
public dkResultSetCursor execute (DKCQExpr cqe) throws DKException, Exception
    Executes a query expression.
    Parameters:
            cqe - a common query expression object
    Returns:
            resultSetCursor which represents a federated datastore cursor.
    Throws: DKException
            if "cqe" object is invalid
    Overrides:
            execute in class dkAbstractDatastore
public void execute WithCallback(dkQuery query,
            dkCallback callbackObj) throws DKException, Exception
    Executes a query with callback function.
    Parameters:
            query - a query object
            callbackObj - a dkCallback object
    Overrides:
            executeWithCallback in class dkAbstractDatastore
public void execute WithCallback(String command,
            short commandLangType,
            DKNVPair params[ ],
            dkCallback callbackObj) throws DKException, Exception
    Execute the query with callback function.
    Parameters:
            command - a query string
            commandLang - a query type
            params - additional query option in name/value pair
            callbackObj - a dkCallback object
    Overrides:
            executeWithCallback in class dkAbstractDatastore
public void execute With Callback(DKCQExpr cqe,
            dkCallback callbackObj) throws DKException, Exception
    Execute a query expression with callback function.
    Parameters:
            cqe - a common query expression object
            callbackObj - a dkCallback object
    Overrides:
            executeWithCallback in class dkAbstractDatastore
public dkQuery createQuery(String command,
            short commandLangType,
            DKNVPair params[ ]) throws DKException
    Creates a federated query object.
    Parameters:
            command - a query string that represents the query criteria
            commandLangType - a query language type, it will be one of the
            following:
                DK_CM_TEMPLATE_QL_TYPE
```

-continued

```
            DK_CM_TEXT_QL_TYPE
            DK_CM_IMAGE_QL_TYPE
            DK_CM_PARAMETRIC_QL_TYPE
            DK_CM_COMBINED_QL_TYPE
        params[ ] - a name/value pairs list
    Returns:
        a federated dkQuery object
    Throws: DKException
        if "command" is null
    Overrides:
        createQuery in class dkAbstractDatastore
public dkQuery create Query(DKCQExpr qe) throws DKException
    Creates a query object.
    Parameters:
        cqe - a common query expression object
    Throws: DKException
        if "cqe" object is invalid
    Overrides:
        createQuery in class dkAbstractDatastore
public dkCollection listDataSources( ) throws DKException
    List the available datastore sources that a user can connect to.
    Returns:
        a collection of ServerDef objects describing the servers
    Throws: DKException
        if internal error occurs from server
    Overrides:
        listDataSources in class dkAbstractDatastore
public String[ ] listDataSourceNames( ) throws DKException
    Gets a list of datasource names.
    Returns:
        an array of datasource names
    Throws: DKException
        if error occurs when retrieving datasource names
    Overrides:
        listDataSourceNames in class dkAbstractDatastore
public void addObject(dkDataObject dataobj) throws DKException, Exception
    Adds a DDO object - since federated datastore does not allow adding object
dynamically, this method will throw DKUsageError exception.
    Parameters:
        ddo - a Federated object to be added.
    Throws: DKException
        is thrown for all calls to this method.
    Overrides:
        addObject in class dkAbstractDatastore
public void deleteObject(dkDataObject dataobj) throws DKException, Exception
    Deletes a data object.
    Parameters:
        ddo - a federated DDO object to be deleted
    Throws: DKException
        since Federated server does not support deletion of documents for now.
    Overrides:
        deleteObject in class dkAbstractDatastore
public void retrieveObject(dkDataObject dataobj) throws DKException, Exception
    Retrieves a data-object.
    Parameters:
        ddo - document object to be retrieved.
    Throws: DKException
        when retrieve failed.
    Overrides:
        retrieveObject in class dkAbstractDatastore
public void updateObject(dkData Object dataobj) throws DKException, Exception
    Updates a data-object.
    Parameters:
        ddo - the data-object to be updated.
    Throws: DKException
        if error occurs in the datastore
    Overrides:
        updateObject in class dkAbstractDatastore
public void commit( ) throws DKException
    Commits all activities since the last commit. This method will do nothing for federated since
this datastore does not support commit/rollback functions.
    Throws: DKException
        is thrown since federated datastore does not support transaction scope for now.
    Overrides:
        commit in class dkAbstractDatastore
public void rollback( ) throws DKException
    Rolls back all activities since the last commit. This method will do nothing
for federated datastore since it does not support commit/rollback functions yet.
    Throws: DKException
```

-continued

```
            is thrown since Federated does not support transaction scope for now.
        Overrides:
            rollback in class dkAbstractDatastore
public boolean isConnected( )
    Checks to see if the datastore is connected
    Returns:
        true if connected, false otherwise
    Overrides:
        isConnected in class dkAbstractDatastore
public DKHandle connection( ) throws Exception
    Gets the connection handle for the datastore.
    Returns:
        the connection handle
    Overrides:
        connection in class dkAbstractDatastore
public DKHandle handle(String type) throws Exception
    Gets a datastore handle.
    Parameters:
        type - type of datastore handle wanted
    Returns:
        a datastore handle
    Overrides:
        handle in class dkAbstractDatastore
public String userName( )
    Gets the user name that user used to logon to the datastore.
    Returns:
        the userid that user used to logon
    Overrides:
        userName in class dkAbstractDatastore
public String datastoreName( ) throws Exception
    Gets the name of this datastore object. Usually it represents a datastore source's server name.
    Returns:
        datastore name
    Overrides:
        datastoreName in class dkAbstractDatastore
public String datastoreType( ) throws Exception
    Gets the datastore type for this datastore object.
    Returns:
        datastore type
    Overrides:
        datastoreType in class dkAbstractDatastore
public dkDatastoreDef datastoreDef( ) throws DKException, Exception
    Gets datastore definition.
    Returns:
        the meta-data (dkDatastoreDef) of this datastore
    Overrides:
        datastoreDef in class dkAbstractDatastore
public dkCollection listEntities( ) throws DKException, Exception
    Gets a list of federated entities from Federated server.
    Returns:
        a collection of dkEntityDef
    Throws: DKException
        if error occurs
    Overrides:
        listEntities in class dkAbstractDatastore
public String[ ] listEntityNames( ) throws DKException, Exception
    Gets a list of federated entities names from Federated server.
    Returns:
        an array of names
    Throws: DKException
        if error occurs
    Overrides:
        listEntityNames in class dkAbstractDatastore
public String[ ] listTextEntityNames( ) throws DKException, Exception
    Gets a List of federated text search entities names from Federated server.
    Returns:
        an array of names
    Throws: DKException
        if error occurs
public String[ ] listParmEntityNames( ) throws DKException, Exception
    Gets a list of federated parametric search entities names from Federated server.
    Returns:
        an array of names
    Throws: DKException
        if error occurs
    Overrides:
        listEntityAttrs
public dkCollection listEntityAttrs(String entityName) throws DKException, Exception
    Gets a list of attributes for a given entity name.
```

-continued

```
        Parameters:
                entityName - name of entity to retrieve attributes for
        Returns:
                a dkCollection of dkAttrDef objects
        Throws: DKException
                if the entity name does not exist
        Overrides:
                listEntityAttrs in class dkAbstractDatastore
public String[ ] listEntityAttrNames(String entityName) throws DKException, Exception
        Gets a list of attribute names for a given entity name.
        Parameters:
                entityName - name of entity to retrieve attribute names for
        Returns:
                an array of attribute names
        Throws: DKException
                if the entity name does not exist
        Overrides:
                listEntityAttrNames in class dkAbstractDatastore
public String registerMapping(DKNVPair sourceMap) throws DKException, Exception
        Registers a mapping definition to this datastore. Mapping is done by entities.
        Parameters:
                sourceMap - source name and mapping, a DKNVPair class with the following
                        possible values:
                                ("BUFFER",) : buffer_ref is a reference to a string in memory
                                ("FILE",) : file_name is the name of the file containing the
                                mapping
                                ("URL",) : URL-address location of the mapping
                                ("LDAP",) : LDAP file-name
                                ("SCHEMA",) : a reference to a dkSchemaMapping object defining
        the
                                mapping. Currently, only "SCHEMA" option is supported, others
        may be
                                added later.
        Returns:
                the name of the mapping definition.
        Overrides:
                registerMapping in class dkAbstractDatastore
        See Also:
                unRegisterMapping
public void unRegisterMapping(String mappingName) throws DKException, Exception
        Unregisters mapping information from this datastore.
        Parameters:
                mappingName - name of the mapping information
        Overrides:
                unRegisterMapping in class dkAbstractDatastore
        See Also:
                registerMapping
public String[ ] listMappingNames( ) throws DKException, Exception
        Gets the list of the registered mappings for this datastore.
        Returns:
                an array of registered mapping objects' names. The array length would be
        zero if there is no mapping registered.
        Overrides:
                listMappingNames in class dkAbstractDatastore
        See Also:
                registerMapping
public dkSchemaMapping getMapping(String mappingName) throws DKException, Exception
        Gets mapping information from this datastore.
        Parameters:
                mappingName - name of the mapping information
        Returns:
                the schema mapping object
        Overrides:
                getMapping in class dkAbstractDatastore
        See Also:
                registerMapping
public synchronized dkExtension getExtension(String extensionName) throws DKException,
        Exception
        Gets the extension object from a given extension name.
        Parameters:
                extensionName - name of the extension object.
        Returns:
                extension object.
        Overrides:
                getExtension in class dkAbstractDatastore
public synchronized void addExtension(String extensionName,
        dkExtension extension Obj) throws DKException, Exception
        Adds a new extension object.
        Parameters:
```

```
            extensionName - name of new extension object
            extensionObj - the extension object to be set
        Overrides:
            addExtension in class dkAbstractDatastore
public synchronized void removeExtension(String extensionName) throws DKException,
    Exception
        Removes an existing extension object.
        Parameters:
            extensionName - name of extension object to be removed
        Overrides:
            removeExtension in class dkAbstractDatastore
public synchronized String[ ] listExtensionNames( ) throws DKException, Exception
        Gets the list of extension objects' names.
        Returns:
            an array of extension objects' names
        Overrides:
            listExtensionNames in class dkAbstractDatastore
public DKDDO createDDO(String objectType,
        int Flags) throws DKException, Exception
        Creates a new DDO with object type, properties and attributes set for a given back-end
server.
        Parameters:
            objectType - the object type
        Flags - to indicate various options and to specify more detailed characteristics of the DDO to
            create. For example, it may be a directive to create a document DDO, a folder,
            etc.
        Returns:
            a new DDO of the given object type with all the properties and
            attributes set, so that the user only needs to set the attribute values
        Overrides:
            createDDO in class dkAbstractDatastore
public dkCollection listSearchTemplates( ) throws DKException, Exception
        Gets a list search templates from a federated server.
        Returns:
            a DKSequentialCollection of search templates
        Throws: DKException
            if internal datastore error occurs
public String[ ] listSearchTemplateNames( ) throws DKException, Exception
        Gets a list search templates' names from a federated server.
        Returns:
            an array of search template names
        Throws: DKException
            if internal datastore error occurs
public dkSearchTemplate getSearchTemplate(String templateName) throws DKException, Exception
        Gets a search template information from a given template name.
        Returns:
            dkSearchTemplate object.
        Throws: DKException
            if internal datastore error occurs
public void destroy( ) throws DKException, Exception
        datastore destroy - datastore cleanup if needed
        Overrides:
            destroy in class dkAbstractDatastore
public synchronized string addRemoveCursor (dkResultSetCursor iCurt int action)
        throws DKException, Exception
public dkDatastore datastoreByServerName (String dsType, String dsName)
        throws DKException, Exception
        Gets a reference to the specified datastore. The datastore must be connected, otherwise it will
return null even if one is found. First, it will look in the free connection pool. If none found, it will
look under the connection pool held by active cursors.
        Parameters:
            <action> consider the case when transaction is active
public void changePassword (String serverName,
    String user Id,
    String oldPwd,
    String newPwd)
    throws DKException, Exception
        Changes the password of a given user Id for a specified server. Administrator only function.
        Parameters:
            userId      - the user-id
            oldPwd      - the old password
            newPwd      -the new password
public void requestConnection (String serverName,
    String userId,
    String passwd,
    String connectString)
    throws DKException, Exception
        Requests a connection to a particular server with the given userid, password & connectString.
        Parameters:
```

```
            userId    -the user Id
            passwd   -the password
            connectString - the connect string to logon
public void excludeServer (Sting serverName, String templateName)
    throws DKException, Exception
    Requests the named server to be skipped for the named search template.
    Parameters:
            serverName     - a back end server name
            templateName - a search template name
public boolean isServerExcluded (String serverName, String templateName)
    throws DKException, Exception, java.rmi.RemoteException
    Checks if the given server is in the excluded list for the named search template.
    Parameters:
            serverName     - a back end server name
            templateName - a search template name
    Returns:
            true or false
public String[ ] listExcludedServers (String templateName) throws DKException, Exception
    Lists all the excluded servers for the named search template
    Parameters:
            s - templateName - a search template name
    Returns:
            an array of server names that were excluded during search
public void clearExcludedServers(String templateName) throws DKException, Exception
    Clears all the excluded servers for the named search template
    Parameters:
            s - templateName - a search template name
```

The following is a example syntax of a federated query string. However, it is to be understood that other syntax, including other parameters, may be used for the federated query string without departing from the scope of the invention.

```
PARAMETRIC_SEARCH=([ENTITY=entity_name,]
        [MAX_RESULTS=maximum_results,]
        [COND=(conditional_expression)]
        [; ...]
        );
    [OPTION=([CONTENT=yes_no]
        )]
[and_or
TEXT_SEARCH=(COND=(text_search_expression)
    );
  [OPTION=([SEARCH_INDEX={search_index_name|(index_list) };]
        [MAX_RESULTS=maximum_results;]
        [TIME_LIMIT=time_limit]
        )]
]
[and_or
IMAGE_SEARCH=(COND=(image_search_expression)
    );
  [OPTION=([SEARCH_INDEX={search_index_name|(index_list) };]
        [MAX_RESULTS=maximum_results;]
        [TIME_LIMIT=time_limit]
        )]
]
```

There are several mechanisms for users to submit federated queries for execution. For example, users can create a federated query string and pass it to a federated query object and then invoke an execute or evaluate method on that object to trigger the query processing. Alternatively, a user can pass the federated query string to the execute or evaluate method in the federated datastore to process the query directly. The query string will be parsed into a federated query canonical form (query expression), which is essentially a datastore neutral representation of the query. In case the input query comes from a graphical user interface (GUI) based application, the query does not need to be parsed and the corresponding canonical form can be directly constructed.

The query canonical form is the input for the federated query processor module. This module will perform the following tasks:

Query translation. Translates the query canonical form into several native queries that corresponds to each native datastore associated to this federated datastore. The translation information is obtained from the schema mapping.

Data conversion. Converts data in the query into a native data type for each of the associated native datastores. This process uses the mapping and conversion mechanisms described in the schema mapping.

Data filtering. Filters only the relevant data during the construction of native queries.

Each native query is submitted to the corresponding native datastore for execution. Initially, the results returned are cursors to the data in each datastore.

The end-result of an initial query is a federated result set cursor object, which is a virtual collection (i.e., at this time, data has not actually been retrieved) of cursors to objects in each of the native datastores.

The user can retrieve the actual data using a fetch. When a fetch is issued for data, the data is returned by the native datastores to the federated query results processor module, which will do the following:

Data conversion. Converts data from the native type into a federated type according to the mapping information.

Data filtering. Filters the results to include only the requested data.

Result merging. Merges the results from several native datastores into a federated collection.

The federated result set cursor object provides the facility to separate query results according to the source native datastores. To do such a processing, the user/application may either use the federated cursor to fetch data or a native datastore cursor to fetch data from a particular datastore.

A FederatedQuery represents and executes queries across heterogeneous datastores. This query can be a combination of a DL parametric query, OnDemand query, and other query types involving supported datastores. To retrieve data from each datastore, the federated datastore delegates the query processing task to each of the native datastores.

FederatedQuery.java

```
package com ibm.mm.sdk.server;
public class FederatedQuery implements Query
{
    public FederatedQuery(Datastore creator, String queryString);
    public FederatedQuery(FederatedQuery fromQuery);
    public void prepare(NVPair params[]);
    public void execute(NVPair params[]);
    public int      status( );
    public Object   result( );
    public short    qlType( );
    public String   queryString( );
    public Datastore datastore( );
    public dkResultSetCursor resultSetCursor( );
    public int numberOfResults( );
};
```

Schema Mapping

A schema mapping represents a mapping between the schema in a datastore with the structure of the data-object that the user wants to process in memory. Schema mapping has been generally described in U.S. patent application Ser. Nos. 08/276,382 and 08/276,747, also assigned to IBM.

A federated schema is the conceptual schema of a federated datastore 100, which defines a mapping between the concepts in the federated datastore 100 to concepts expressed in each participating datastore schema. In general, a schema mapping handles the difference between how the data are stored in the datastore (as expressed by the datastore's conceptual schema) and how the user wants to process them in the application program. This mapping can also be extended to incorporate relationship associations among entities in a federated datastore, e.g., associating an employee's name with the appropriate department name. Since the mapping process can be a bit tedious, it is usually done with the help of a typical GUI-oriented schema mapping program.

In addition to schema-mapping information involving the mapping of entities and attributes, a federated datastore 100 must also have access to the following information:

User-id and password mapping. To support single sign-on features, each user-id in the federated datastore 100 needs to be mapped to its corresponding user-ids in the native datastores.

Datastore registration. Each native datastore needs to be registered so it can be located and logged-on to by the federated datastore 100 processes on behalf of its users.

Messaging Service in a Federated Content Management System

An embodiment of the invention provides a messaging service system. The messaging service system provides messaging passing, content forwarding, and event notification in a federated content management system. The messaging service system will leverage the functionality of applications with the messaging capability for independent software vendors (ISVs) using, for example, an IBM Enterprise Information Portal. A portal is a web site or service that offers access to a variety of different resources and services, such as e-mail and search engines. An enterprise is a large organization that utilizes computers. Thus, the IBM Enterprise Information Portal is designed to help corporations leverage the vast and growing amount of information supporting e-business applications. With the services it provides, business users can personalize data queries, search extensively for very specific needs, and utilize relevant results—from across a number of data sources, both traditional and multimedia.

The messaging service system addresses the three problems in conventional federated content management systems which lack the following capabilities: message passing, content forwarding, and event notification.

A. Client/Server Architecture

Figure 5:
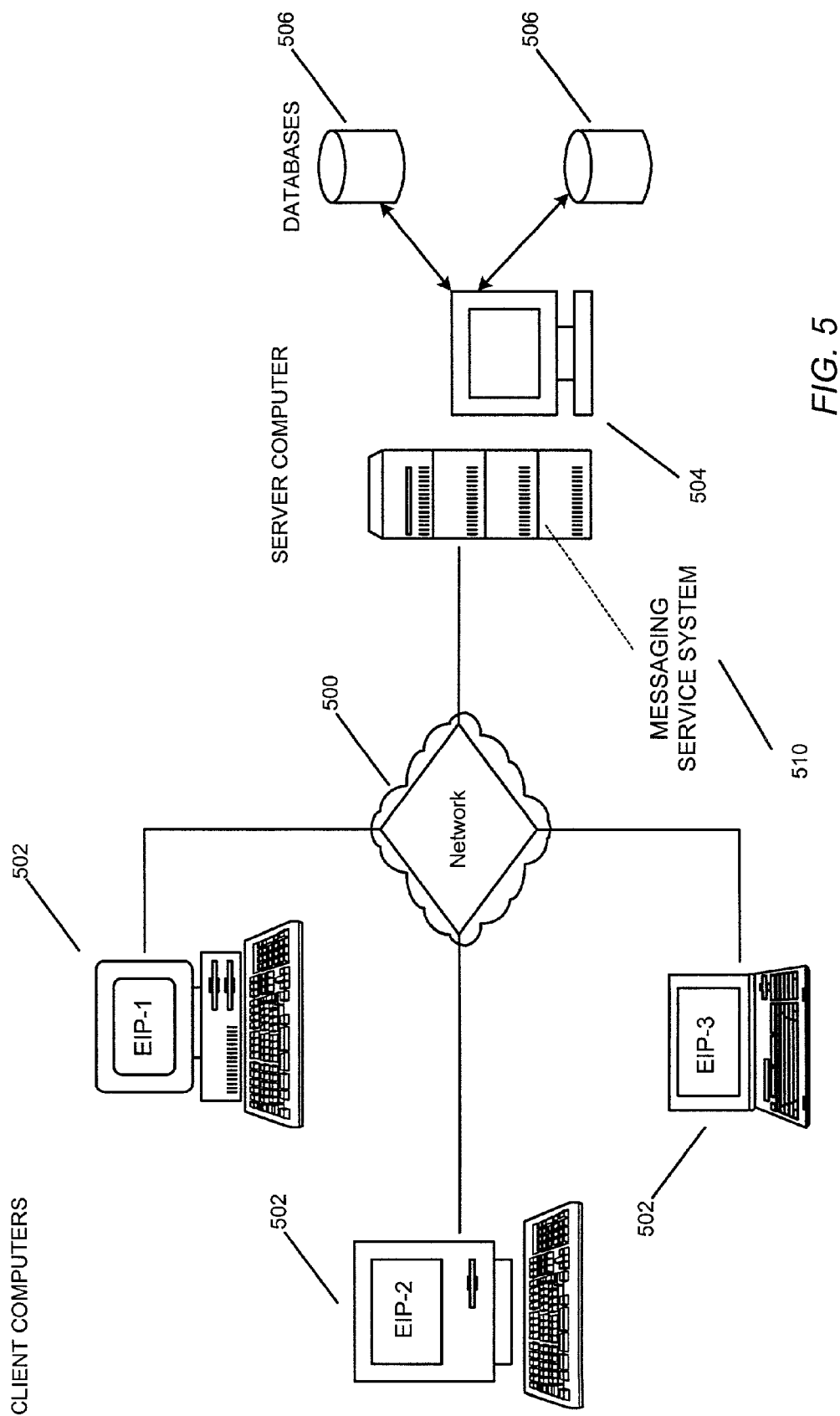
FIG. 5 schematically illustrates a hardware environment of an embodiment of the present invention.

FIG. 5 schematically illustrates a hardware environment of an embodiment of the present invention, and more particularly, illustrates a typical distributed computer system using a network 500 to connect client computers 502 executing client programs to a server computer 504 executing server software and other computer programs, and to connect the server system 504 to data sources 506. A data source 506 may comprise, for example, a multi-media database containing items (e.g., video, audio, and text items).

A typical combination of resources may include client computers 502 that are personal computers or workstations, and a server computer 504 that is a personal computer, workstation, minicomputer, or mainframe. These systems are coupled to one another by various networks, including LANs, WANs, SNA networks, and the Internet. Each client computer 502 and the server computer 504 additionally comprise an operating system and one or more computer programs.

A client computer 502 typically executes a client application and is coupled to a server computer 504 executing server software. The client application may be a computer program such as a browser. In FIG. 5, each client computer 502 executes an Enterprise Information Portal (EIP-1,EIP-2,and EIP-3, respectively).

The server software includes a Messaging Service System 510, which is a computer program for providing messaging capabilities. The server computer 504 also uses a data source interface and, possibly, other computer programs, for connecting to the data sources 506. The client computer 502 is bi-directionally coupled with the server computer 504 over a line or via a wireless system. In turn, the server computer 504 is bi-directionally coupled with data sources 506.

The data source interface may be connected to a Database Management System (DBMS), which supports access to a data source 506 by executing, for example, RDBMS software. The interface and DBMS may be located at the server computer 504 or may be located on one or more separate machines. The data sources 506 may be geographically distributed.

The operating system and computer programs are comprised of instructions which, when read and executed by the client and server computers 502 and 540, cause the client and server computers 502 and 540 to perform the steps necessary to implement and/or use the present invention. Generally, the operating system and computer programs are tangibly embodied in and/or readable from a device, carrier, or media, such as memory, other data storage devices, and/or data communications devices. Under control of the operating system, the computer programs may be loaded from memory, other data storage devices and/or data communications devices into the memory of the computer for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 5 is not intended to limit the present invention. Indeed, those skilled in the art will recognize that other alternative hardware environments may be used without departing from the scope of the present invention. For example, the server computer 504 may be a federated content management system that is connected to heterogeneous data sources.

B. Overview

A federated content management system presents a unique challenge for the design of a technique for passing messages, forwarding content, and providing event notification, especially because it has heterogeneous back-end servers, each of which may store and retrieve different types of content. The messaging service system 510 enables messaging capability for a federated content management system, regardless of what back-end servers are being used. For example, if EIP-1 at a first client computer 502 requests a search from a server computer, such as a federated content management system, the results of the search may include a list of items from multiple servers. In conventional systems, if EIP-2 at a second client computer 502 wanted the same search results, it would have to request another search, which is an inefficient use of resources. With the messaging service system 510, EIP-1 can now pass the results of its search to EIP-2.

The messaging service system 510 defines a message structure to organize the text and content to be sent and received. In one embodiment, the message structure is presented as a formal grammar. A set of object-oriented messaging APIs are defined to allow applications to send and receive messages in a federated content management system. This set of messaging APIs will facilitate the development of messaging-based applications.

The messaging service system 510 allows an application to communicate with another application in a federated content management system, regardless of physical machine locations (e.g., local or remote) or implementation languages (e.g., C++, Java, or ActiveX). The messaging service system 510 enables inter-application communication across heterogeneous back-end servers, which in turn enables development of sophisticated messaging-based applications.

Some aspects of the messaging service system 510 are as follows:

(1) Message passing—an application can send a message to another application.
(2) Content forwarding—an application can forward content of search results to another application.
(3) Event notification—an application can notify another application when an event occurs.

Messaging plays a crucial role in enterprise computing, for example, for the IBM Enterprise Information Portal in the federated content management space. It is to be understood, however, that the concepts of the invention are generally applicable to any systems that require communication (e.g., database products).

The messaging service system 510 enables a messaging capability for a federated content management system via a message structure and a set of object-oriented messaging APIs. The message structure is defined to organize the text and content to be sent and received. A set of object-oriented messaging APIs are defined to allow applications to send and receive messages in a federated content management system.

Figure 6:
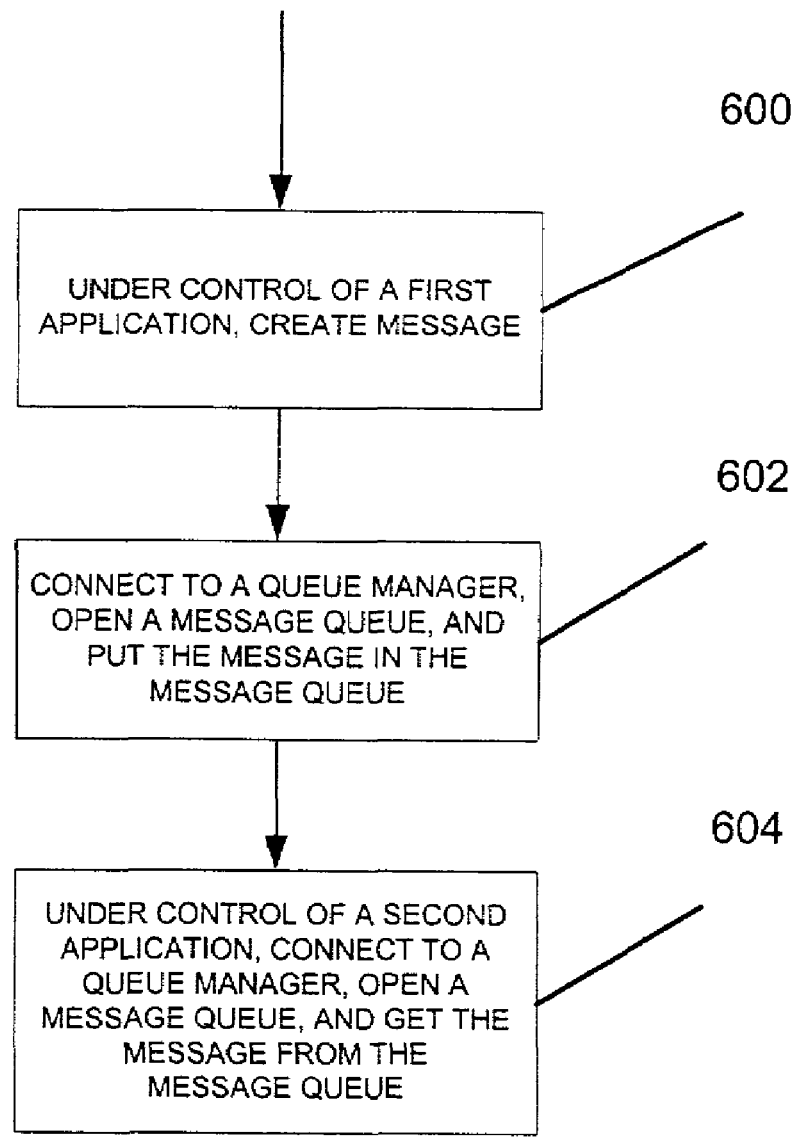
FIG. 6 provides an overview of processing with the messaging service system.

FIG. 6 provides an overview of processing with the messaging service system 510. In block 600, under control of a first application program, a message is created. The first application program connects to a queue manager, opens a message queue, and puts the message in the message queue, in block 602. Then, under control of a second application program, in block 604, a connection is made to a queue manager, the message queue is opened, and the message is retrieved from the message queue. Further details of this process are provided below.

C. Message Structure

A message consists of a sequence of terms which are separated by a semi-colon (";"). A message allows any combination of text and/or content. Text is a string of alphanumeric characters; content is a list of content identifiers ("IDs"). The length of text is specified in the message structure, along with a count (i.e., number) of content IDs. Due to performance and authority considerations, in one embodiment, a content ID (rather than, for example, actual content) will be used in the message structure. A content ID has two parts: an item identifier ("item ID") and a server name. The item ID is a unique identifier of an item in a server, and the server name identifies which server the item belongs to. The item ID and its server name together can uniquely identify an item in a federated content management system. The following is a message structure that is defined and expressed as a formal grammar below in one embodiment of the invention.

MESSAGE=TEXT_LENGTH; CONTENT_ID_COUNT; [TEXT;] [CONTENT_ID_LIST]where:
An uppercase word represents a term
Brackets ([ ]) indicate an optional term
A semi-colon (;) is a delimiter
An equal operator (=) indicates how a term is defined
TEXT_LENGTH=Length of the text string
CONTENT_ID_COUNT=Count of content IDs
TEXT=String of alphanumeric characters
CONTENT_ID_LIST=CONTENT_ID; [CONTENT_ID_LIST]
CONTENT_ID=ITEM_ID; SERVER_NAME
ITEM_ID=identifier of an item (i.e., data item)
SERVER_NAME=Name of a server The following table shows some example combinations of text and content in a message, where L is the length of text $(1 \leq L)$ and N is a number of content IDs, $(2 \leq N)$:

| Text Length | Content ID Count | Usage |
| --- | --- | --- |
| 0 | 0 | event notification |
| 0 | 1 | one content ID |
| 0 | N | multiple content IDs |
| L | 0 | text only |
| L | 1 | text with one content ID |
| L | N | text with multiple content IDs |

When the text length and content ID count are both zero, the message structure is being used for event notification. When, the text length is zero and the content count is a number (i.e., one to N), the message structure is being used to forward one or more items (i.e., data items from a database, including without limitation, a list of search results). When the text length is greater than or equal to one, and the content ID count is zero, the message structure is being used to pass text. When the text length is greater than or equal to one, and the content ID count is a number (i.e., one to N), the message structure is being used to forward text and one or more content IDs representing items.

The following are examples of messages for various combinations of text and content.

0;0;

The message has no text and there are no content IDs.

0;1ItemID1;Server1;

The message has no text, but one content ID with item ID="ItemID1" and server name="Server1".

0;2;ItemID1;Server1;ItemID2;Server2;

The message has no text, but two content IDs with "ItemID1", "Server1", and "ItemID2", "Server2".

6;0;Hello!;

The message has a text string "Hello!" of length six and no content IDs.

6;1;Hello!;ItemID1;Server1;

The message has a text string "Hello!" of length six and one content ID with item ID="ItemID1" and server name="Server1".

6;2;Hello!;ItemID1;Server1;ItemID2;Server2;

The message has a text string "Hello!" of length six and two content IDs with "ItemID1", "Server1", and "ItemID2", "Server2".

D. Object-Oriented Messaging API

The messaging service system 510 provides a set of object-oriented messaging APIs. In one embodiment, the object-oriented messaging APIs consist of two classes: DKMessagingService and DKMessageObject. Additionally, in one embodiment, the messaging service system 510 integrates the IBM Message Queue technology with an IBM EIP object-oriented API framework. It is to be understood, however, that the concepts of the invention are applicable to any message transfer or queuing technology.

The DKMessagingService class defines a set of basic messaging services including connect, disconnect, open queue, close queue, and put/get message. A typical scenario is that an application connects to a queue manager, opens a queue, puts or gets a message, closes a queue, and disconnects from the queue manager. In one embodiment, the message in the message queue will follow the FIFO (First-In, First-Out) principle.

The following is an example DKMessagingService class definition for one embodiment of the invention:

```
class DKMessagingService
{
    public:
        DKMessagingService ( );
        -DKMessagingService( );
        void connect (const char* queue_manager)';
        void disconnect ( );
        void openQueue (const char* queue);
        void closeQueue ( );
        DKString queryManagerName( );
        void putMessage (DKMessageObject* message);
        DKMessageObject* getMessage ( );
};
```

The following are the methods of the DKMessagingService class:

DKMessagingServiceo( )—This is the constructor of DKMessagingService.

-DKMessagingServiceo( )—This is the destructor of DKMessagingService.

void connect(const char* queue_manager)—This method allows an application to connect to the specified queue manager. In one embodiment, only one query manager can be connected at a time.

void disconnect( )—The method disconnects an application from a queue manager.

void openQueue(const char* queue)—This method opens the specified queue in a connected queue manager. In one embodiment, only one query can be opened at a time.

void closeQueue( )—The method closes an opened queue.

DKString queryManagerName( )—This method returns the name of the query manager, if connected. Otherwise, an empty string will be returned.

void putMessage(DKMessageObject* message)—The method puts a message into an opened queue. The message is represented as a DKMessageObject object.

DKMessageObject* getmessage( )—The method gets a message from an opened queue. The message is represented as a DKMessageObject object.

The DKMessageObject class defines the object-oriented representation of a message based on the message structure mentioned earlier. A DKMessageObject can be created by using one of the two constructors. Several access methods are also available to get the length of text, count of content IDs, string of text, list of content IDs, and the string of message.

The following is an example DKMessageObject class definition for one embodiment of the invention:

```
class DKMessageObject
{
    public:
        DKMessageObject (const char * text, dkCollection* content_id_list);
        DKMessageObject (const char * message);
        ~DKMessageObject ( );
        long getTextLength ( );
        DKString getText ( );
        long getContentIDCount( );
        dkCollection* getContentIDList( );
        DKString getMessageString( );
};
```

The following are the methods of the DKMessageObject class:

DKMessageObject (const char * text, dkCollection* content_id_list)—This is a constructor of DKMessageObject with two parameters: a string of text and a list of content IDs. This constructs a message to be sent or received.

DKMessageObject (const char * message)—This method constructs a DKMessageObject based on the specified message that follows the message structure.

-DKMessageObject( )—This is the destructor of DKMessageObject.

long getTextLength( )—The method returns the length of text in the message. A zero means no text is kept in the message.

DKString getText( )—The method retrieves the text in the message, if any. Otherwise, an empty string will be returned.

long getContentIDCount( )—This method returns the count of content IDs in the list. A zero means no content ID is kept in the message.

dkCollection* getContentIDList( )—This method gets a list of content IDs. Each content ID is a pair of an item ID and its server name.

DKString getMessageString( )—The method returns the message as a string.

The following is sample psuedocode that provides an example of putting a message in a queue, with comments following the asterisks:

DKMessagingService* ms; *** define a pointer for ms
DKMessageObject* message; *** define a pointer for message
ms=new DKMessagingService( ); *** instantiate DKMessagingService( ) object
ms>connect ("SANJOSE.QUERY.MANAGER"); ***connect to a queue manager
cout<<"Query manager name is="<<ms->queryManagerName( )<<end1; *** print name
ms->openQueue ("SYSTEM.DEFAULT.LOCAL.QUEUE"); *** open a queue
message=new DKMessageObject ("Hello!", NULL); *** instantiate DKMessageObject object
ms->putMessage (message); *** put a message in the queue
delete message; *** delete the pointer for message
ms->closeQueue( ); *** close the queue
ms->disconnect( ); *** disconnect from the queue manager
delete ms; *** delete the pointer for ms The above application program defines (e.g., allocates memory to) pointers (i.e., ms and message) and instantiates a DKMessagingService object. In order to put a message into a queue, the application program first connects to a query manager, for example "SANJOSE.QUERY.MANAGER". Additionally, the application program displays the name of the query manager. Then it opens a queue, for example "SYSTEM.DEFAULT.LOCAL.QUEUE". ADKMessageObject object is instantiated, and a message is constructed with a text "Hello!" and no content ID. Next, the application program puts the message into the queue. The application program deletes (e.g., deallocates memory for) the pointer for message. The application program closes the queue and disconnects from the queue manager. Finally, the application program deletes (e.g., deallocates memory for) the pointer for ms.

The following is sample psuedocode that provides an example of getting a message from a queue, with comments following the asterisks:

DKMessagingService* ms; *** define pointer for ms
DKMessageObject* message; *** define pointer for ms
ms=new DKMessagingService ( ); ***instantiate DKMessagingService ( ) object
ms->connect ("SANJOSE.QUERY.MANAGER");*** connect to a queue manager
cout <<"Query manager name is="<<ms->queryManagerName ( )<<end1; *** print name
ms->openQueue ("SYSTEM.DEFAULT.LOCAL.QUEUE"); *** open a queue
message=ms->getMessage ( ); *** get a message from the queue
cout<<"Text is ="<<message->getText ( )<<end1; *** print text message
delete message; *** delete the pointer for message
ms->closeQueue( ); ***close the queue
ms->disconnect( ); ***disconnect from the queue manager
delete ms; *** delete the pointer for ms The above application program defines (e.g., allocates memory to) pointers (i.e., ms and message) and instantiates a DKMessaging Service object. In order to get a message from a queue, the application program first connects to a query manager, for example "SANJOSE.QUERY.MANAGER". Additionally, the application program displays the name of the query manager. Then it opens a queue, for example "SYSTEM.DEFAULT.LOCAL.QUEUE". A message is retrieved from the queue, and the text of the message is printed. The application program deletes (e.g., deallocates memory for) the pointer for message. The application program closes the queue and disconnects from the queue manager. Finally, the application program deletes (e.g., deallocates memory for) the pointer for ms.

CONCLUSION

This concludes the description of embodiments of the invention. The following describes some alternative embodiments for accomplishing the present invention. For example, any type of computer, such as a mainframe, minicomputer, personal computer, mobile device, or embedded system, or computer configuration, such as a timesharing mainframe, local area network, or standalone personal computer, could be used with the techniques of the present invention.

The foregoing description of embodiments of the invention has been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A method for communication between a first computer and a second computer, each of which is connected to a server computer, the method comprising:
    under control of a first client application at the first computer,
        creating a message, wherein the message comprises at least one out of a group of: an event notification with zero text and zero content identifiers, a text message, and a content identifier; and
        putting the message into a message queue; and
    under control of a second client application at the second computer, retrieving the message from the message queue;
    wherein the first computer, the second computer, and the server computer form part of a federated content management system and wherein the federated content management system further comprises heterogeneous servers connected to the server computer;
    wherein the heterogeneous servers are connected to heterogeneous datastores forming part of the federated content management system and wherein the heterogeneous datastores store multimedia data and are combined into a consistent and unified conceptual view; and
    wherein the message comprises search results from a search executed by the first computer searching for a specified content in the multimedia data of the heterogeneous datastores.

2. The method of claim 1, wherein text comprises a string of alphanumeric characters.

3. The method of claim 1, wherein the content identifier comprises an item identifier and a server name.

4. The method of claim 3, wherein the server name identifies one of the heterogeneous servers that is connected to a data store storing an item corresponding to the item identifier.

5. The method of claim 1, wherein the message comprises an event notification with zero text and zero content identifiers.

6. The method of claim 1, wherein the message comprises text with zero content identifiers.

7. The method of claim 1, wherein the message comprises zero text and one or more content identifiers that represent items in a data store connected to at least one of the heterogeneous servers.

8. The method of claim 1, wherein the message comprises an object.

9. The method of claim 1, wherein the message is put into the message queue via a method of a class.

10. The method of claim 1, wherein the message is retrieved from the message queue via a method of a class.

11. The method according to claim 1, wherein under said control of the first client application, the first computer connects to a queue manager located on the server computer and puts the message into the message queue, and wherein under said control of the second client application, the second computer connects to the same queue manager located on the server computer and retrieves the message from the message queue.

12. The method according to claim 1, wherein the first application is a browser on the first computer.

13. An apparatus for communication between computers, comprising:
a first computer connected to a server computer;
a second computer connected to the first computer and to the server computer in a datastore management system; and
one or more computer programs, performed by the first and second computers, for:
under control of a first client application at the first computer,
creating a message, wherein the message comprises at least one out of a group of: an event notification with zero text and zero content identifiers, text, and content identifier; and
putting the message into a message queue; and
under control of a second client application at the second computer, retrieving the message from the message queue,
wherein the first computer, the second computer, and the server computer form part of a federated content management system and wherein the federated content management system further comprises heterogeneous servers connected to the server computer;
wherein the heterogeneous servers are connected to heterogeneous datastores forming part of the federated content management system and wherein the heterogeneous datastores store multimedia data and are combined into a consistent and unified conceptual view; and
wherein the message comprises search results from a search executed by the first computer searching for a specified content in the multimedia data of the heterogeneous datastores.

14. The apparatus of claim 13, wherein text comprises a string of alphanumeric characters.

15. The apparatus of claim 13, wherein a content identifier comprises an item identifier and a server name.

16. The apparatus of claim 13, wherein the message comprises an event notification with zero text and zero content identifiers.

17. The apparatus of claim 13, wherein the message comprises text with zero content identifiers.

18. The apparatus of claim 13, wherein the message comprises zero text and one or more content identifiers that represent items in a data store connected to the server computer.

19. The apparatus of claim 13, wherein the message comprises an object.

20. The apparatus of claim 13, wherein the message is put into the message queue via a method of a class.

21. The apparatus of claim 13, wherein the message is retrieved from the message queue via a method of a class.

22. An article of manufacture comprising a program storage medium readable by a computer and embodying one or more instructions executable by the computer to perform method steps for communication between a first computer and a second computer, each of which is connected to a server computer, comprising:
under control of a first client application at the first computer,
creating a message, wherein the message comprises at least one out of the group of event notification with zero text and zero content identifiers, text, and content identifier; and
putting the message into a message queue; and
under control of a second client application at the second computer, retrieving the message from the message queue,
wherein said first and second computers and said server are in a datastore management system,
wherein the first computer, the second computer, and the server computer form part of a federated content management system and wherein the federated content management system further comprises heterogeneous servers connected to the server computer;
wherein the heterogeneous servers are connected to heterogeneous datastores forming part of the federated content management system and wherein the heterogeneous datastores store multimedia data and are combined into a consistent and unified conceptual view; and
wherein the message comprises search results from a search executed by the first computer searching for a specified content in the multimedia data of the heterogeneous datastores.

23. The article of manufacture of claim 22, wherein text comprises a string of alphanumeric characters.

24. The article of manufacture of claim 22, wherein a content identifier comprises an item identifier and a server name.

25. The article of manufacture of claim 22, wherein the message comprises an event notification with zero text and zero content identifiers.

26. The article of manufacture of claim 22, wherein the message comprises text with zero content identifiers.

27. The article of manufacture of claim 22, wherein the message comprises zero text and one or more content identifiers that represent items in a data store connected to the server computer.

28. The article of manufacture of claim 22, wherein the message comprises an object.

29. The article of manufacture of claim 22, wherein the message is put into the message queue via a method of a class.

30. The article of manufacture of claim 22, wherein the message is retrieved from the message queue via a method of a class.

* * * * *